(12) United States Patent
Donnelly

(10) Patent No.: US 6,353,407 B1
(45) Date of Patent: Mar. 5, 2002

(54) RADAR TANK LEVEL INDICATING SYSTEM FOR MEASUREMENT OF WATER CONTENT IN SHIPBOARD TANK INVOLVING IDENTIFICATION OF FUEL-WATER INTERFACE

(75) Inventor: Timothy C. Donnelly, Philadelphia, PA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/816,725

(22) Filed: Mar. 22, 2001

(51) Int. Cl.⁷ .............................................. G01S 13/88
(52) U.S. Cl. .................. 342/124; 342/118; 73/290 R; 73/305; 73/290 B
(58) Field of Search .................... 342/21, 22, 27, 342/118, 119, 120, 121, 122, 123, 124, 175, 195; 73/290 R, 290 B, 304 R, 304 C, 305–322, 322.5, 290 V

(56) References Cited

U.S. PATENT DOCUMENTS 5,070,730 A * 12/1991 Edvardsson ............... 73/290 V
5,327,139 A * 7/1994 Johnson ...................... 342/22
5,629,706 A * 5/1997 Bååth .......................... 342/124
6,198,424 B1 * 3/2001 Diede et al. ................. 342/22
6,229,476 B1 * 5/2001 Lutke et al. ................ 342/124

OTHER PUBLICATIONS

Article entitled Measuring Level with Radar Technology published in Sensors Magazine, Apr. 1993.

* cited by examiner

Primary Examiner—Bernarr E. Gregory
(74) Attorney, Agent, or Firm—Jacob Shuster

(57) ABSTRACT

A microwave radar signal system generates separate level indicating signals for transmittal through a sounding tube into a contamination tank having a mixture of fuel and gross free water collected therein. The separate level indicating signals are thereby respectively reflected from the level of a top surface of the collected liquid mixture and a lower level of an interface between the fuel and the gross free water portions of the mixture to respectively provide data for determination of total liquid volume collected and the volumetric content of the fuel therein. The interface level location is established by means of a floatation ball disposed within the sounding tube, from which level indicating signals are reflected.

8 Claims, 2 Drawing Sheets

RADAR TANK LEVEL INDICATING SYSTEM FOR MEASUREMENT OF WATER CONTENT IN SHIPBOARD TANK INVOLVING IDENTIFICATION OF FUEL-WATER INTERFACE

The present invention relates generally to monitoring the content of liquid contamination tanks.

BACKGROUND OF THE INVENTION

Microwave radiation systems have been utilized on-board marine vessels including naval ships for monitoring changes in level of a particular fluid product contained within holding tanks. Such a microwave radar system is described for example in an article entitled "Measuring Level With Radar Technology", published in a magazine SENSORS, dated April 1993. Such a system involves reflection of a radar signal from the top of the liquid in the tank for reception by the radar antenna transmitting the signal and conversion thereof into output data on total volumetric content of the collected liquid in the tank. Current processes and equipment involving radar type tank level indicating systems cannot differentiate between differing liquids within one tank, such as fuel and water or a mixture of two liquids forming a slurry interface. Shipboard fuel quality operations now usually dictate stripping of settled contaminants from the lowest point in a fuel storage tank, from which the contaminants with water and sediment are directed to a holding tank. Once such holding tank is full, usable fuel is reclaimed therefrom through a series of filtration processes for economic and environmental purposes. Natural settling causes the water to settle lower than the fuel and is removed prior to fuel reclamation. Nevertheless, large amounts of fuel-water mixture is directed overboard to avoid admission of gross water during the fuel reclamation process. It is therefore an important object of the present invention to provide a modified form of the foregoing type of radar signal system for monitoring the collection of fuel and water mixture in a contamination tank, which will indicate the relative amount of gross free water of the mixture collected within the tank.

SUMMARY OF THE INVENTION

In accordance with the present invention, a contamination tank within which a mixture of fuel and gross free water is collected will be monitored by a microwave radar system involving generation and transmission of separate level indicating signals which are respectively reflected from the top surface of the liquid mixture in the tank and an interface between the fuel and the gross free water of such mixture. The interface signal reflection is effected by disposition of a floatation ball at the interface level in the collected mixture, within the sounding tube of the radar system through which both of the level indicating signals are transmitted and reflected respectively from the top tank surface level of the liquid and the interface ball location. Pursuant to the present invention, such reflected signals are mixed to provide an output from which the volumetric content of the gross free water collected in the tank in addition to the total collected liquid volume may be obtained.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
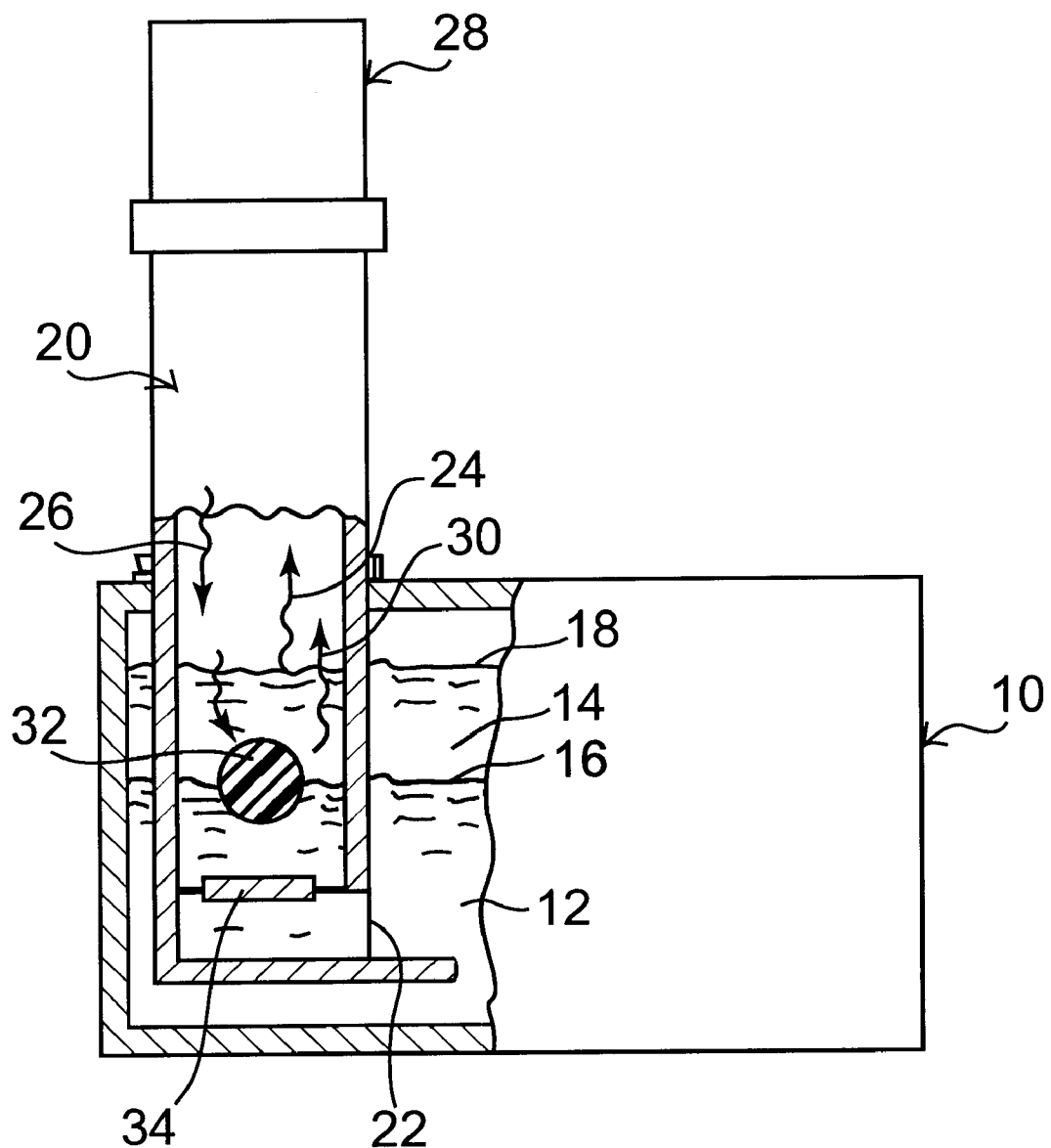
FIG. 1 is a side elevation view in partial section, illustrating a contamination tank in association with a radar level monitoring system pursuant to the present invention.

Referring now to the drawing in detail, FIG. 1 illustrates a liquid storage tank 10 such as those associated fuel reclamation systems on board naval vessels. Such a tank 10 receives contaminated liquid in the form of a fuel-water mixture, so that the gross-free water 12 settles in the tank 10 below the lighter density fuel 14. The gross-free water 12 accordingly forms an interface 16 with the fuel 14 thereabove to establish a top liquid surface 18 within the tank 10, as shown in FIG. 1.

Heretofore, a microwave radar type of level indicating system to be associated with the liquid storage contamination tank 10, included an existing vertical sounding tube 20 extending into and upwardly from the tank 10 adjacent to one end thereof as shown in FIG. 1. The liquid accordingly entered into such tube 20, through an inlet 22 at its lower end adjacent to the bottom of the tank 10, and rose to the level of the top liquid surface 18 from which reflected radar signals 24 rose upwardly in response to downward transmission of tank level indicating radar signals originated from a microwave radar signal device 28 mounted on top of the tube 20, of a type generally known in the art. Such signal device 28 is modified in accordance with the present invention, as hereinafter indicated, to generate downwardly directed signals 26 in the tube 20 and receive the upwardly rising signals 24 reflected from the top tank level surface 18, including reflected signals 30 indicating the level of interface 16.

Reflection of the interface level indicating signals 30 within the tube 20, is achieved according to the present invention by means of a float ball 32 as shown in FIG. 1. The float ball 32 is accordingly made of a material having a density arranged for its floating support by the gross-free water 12 at the level of the interface 16 below the top level 18. A trap element 34 is fixed within the tube 20 at its lower end to prevent exiting of the ball 32 from the tube outlet 22.

Figure 2:
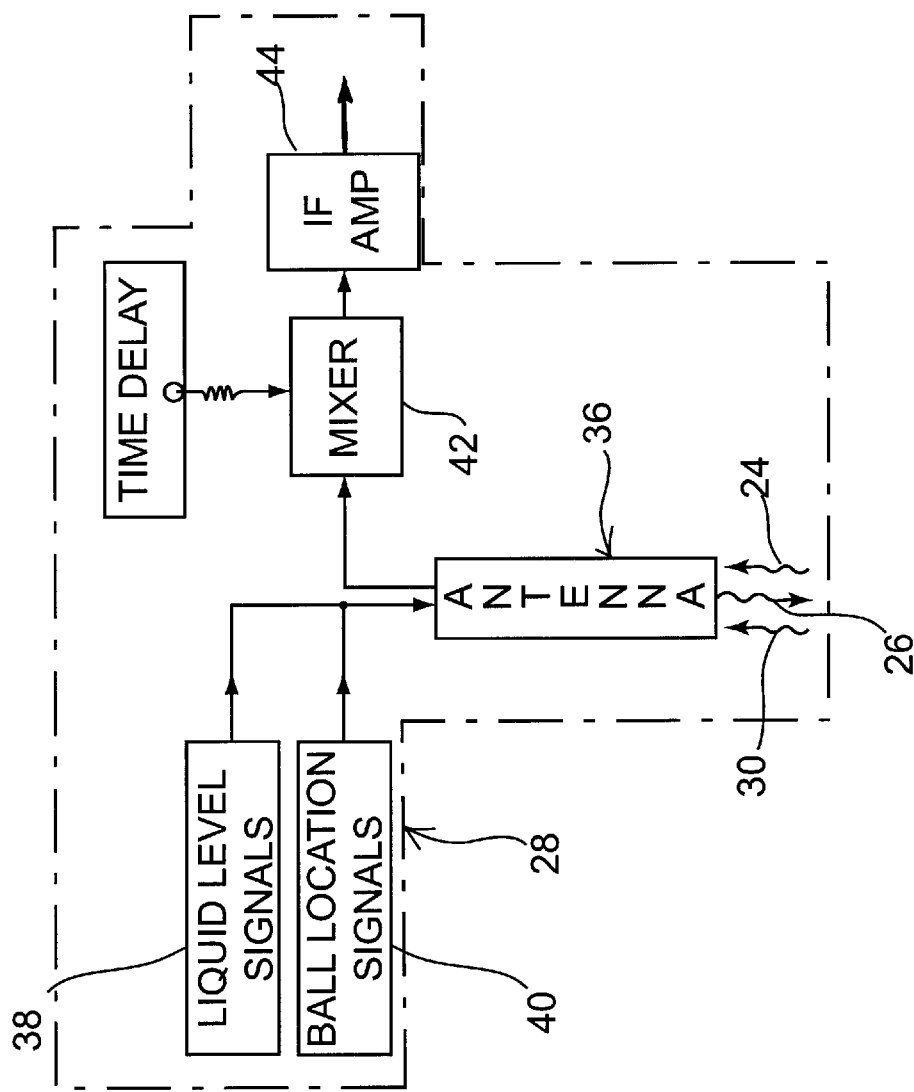
FIG. 2 is a block diagram of the radar system.

As diagrammed in FIG. 2, an antenna 36 is associated with the radar signal device 28. In addition to generation of liquid level indicating signals 38 fed to the antenna 36 for transmission within the tube 20, the radar signal device 28 also generates and applies to the antenna 36 separate ball location level indicating signals 40. Transmission of such ball location signals 40 is such as to be reflected by the ball 32 at the level of the interface 16 and received as the reflected interface signals 30 by the antenna 36 within the sounding tube 20 together with the reflected top level signals 24 in order to provide an output to the time delay controlled mixer 42 associated with the radar signal device 28. Such output of the mixer 42 is fed through an amplifier 44 to a computer having software 46 for analyzing both top liquid level and interface level from which the analyzed data is converted into data respectively indicating total volumetric liquid content 48 and gross free-water volumetric content 50 of the liquid mixture in the tank 10.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a contamination tank within which a mixture of fuel and gross free water is collected, a system for monitoring volumetric content of the mixture within the tank by means of level indicating radar signals, including: a sounding tube extending into the tank through which the level indicating radar signals are transmitted to and below a top surface level of the mixture in the tank; and output amplifier means responsive to the radar signals reflected from the top surface level for providing data on volumetric content of the mixture collected in the tank below said top surface level; the improvement residing in: floatation ball means for disposal within the sounding tube at an interface location level between the fuel and gross water in the tank at which one of the level indicating radar signals is reflected; and mixer means responsive to said one of the radar signals for providing data to the output amplifier means on the volumetric content limited to the gross free water.

2. The system as defined in claim 1, further including: retention means fixedly mounted in the sounding tube at a lower end thereof within the tank for preventing exit of the floatation ball means from the sounding tube.

3. In combination with a contamination tank within which a mixture of fuel and gross free water is collected, a system for monitoring volumetric content of the mixture within the tank by means of level indicating radar signals, including: a sounding tube extending into the tank through which the level indicating radar signals are transmitted to the mixture and reflected therefrom; and data output means responsive to the reflected radar signals; the improvement residing in: reflection means within said sounding tube for effecting reflection of the level indicating radar signals at an interface level location between the fuel and the gross-free water in the tank; and mixer means for providing data to the output means on the volumetric content limited to the gross free water in response to the level indicating radar signals reflected at said interface level.

4. The improvement as defined in claim 3, wherein said reflection means is a floatation ball.

5. The improvement as defined in claim 4, further including: retention means fixedly mounted in the sounding tube at a lower end thereof within the tank for preventing exit of the floatation ball from the sounding tube.

6. In a radar system for monitoring a liquid mixture of fuel and gross-free water collected within a tank by transmittal of a level indicating signal toward a top surface of the liquid from which the signal is reflected to determine total volumetric content of the liquid in the tank, the improvement residing in: generating an additional transmitted signal for reflection from an interface level in the tank between said fuel and the gross-free water; and mixing the reflection of said additional signal with the level indicating signal from which volumetric content related to the gross-free water in the tank is determined.

7. The improvement as defined in claim 6, wherein a floatation ball is disposed within the liquid mixture to establish a location for the interface level within the tank from which said reflection of the additional signal occurs.

8. In a radar system for monitoring a mixture of fuel and gross-free water collected within a tank by transmittal of a level indicating signal toward a top surface of the mixture from which the signal is reflected to determine total volumetric content of the mixture, the improvement including the steps of: establishing by means of a floatation ball an interface level within the tank between the fuel and the gross-free water; and generating an additional signal transmitted into the tank for reflection from the interface level.

\* \* \* \* \*